(12) United States Patent
Tachon

(10) Patent No.: US 10,226,903 B2
(45) Date of Patent: Mar. 12, 2019

(54) REINFORCED PLASTIC MATERIAL HAVING HIGH SMOOTHNESS

(71) Applicant: TOYOTA MOTOR EUROPE NV/SA, Brussels (BE)

(72) Inventor: Julien Tachon, Forest (BE)

(73) Assignee: TOYOTA MOTOR EUROPE, Brussels (BE)

( * ) Notice: Subject to any disclaimer, the term of this patent is extended or adjusted under 35 U.S.C. 154(b) by 13 days.

(21) Appl. No.: 15/110,860

(22) PCT Filed: Jan. 9, 2014

(86) PCT No.: PCT/EP2014/050329
§ 371 (c)(1),
(2) Date: Jul. 11, 2016

(87) PCT Pub. No.: WO2015/113585
PCT Pub. Date: Aug. 6, 2015

(65) Prior Publication Data
US 2016/0332389 A1 Nov. 17, 2016

(51) Int. Cl.
| | | |
|---|---|---|
| B29C 70/08 | (2006.01) |
| B32B 27/12 | (2006.01) |
| B32B 27/34 | (2006.01) |
| B32B 5/02 | (2006.01) |
| B32B 5/12 | (2006.01) |
| B32B 27/28 | (2006.01) |
| B29C 70/46 | (2006.01) |

(52) U.S. Cl.
CPC .......... *B29C 70/083* (2013.01); *B29C 70/467* (2013.01); *B32B 5/022* (2013.01); *B32B 5/12* (2013.01); *B32B 27/12* (2013.01); *B32B 27/286* (2013.01); *B32B 27/34* (2013.01); *B32B 2260/021* (2013.01); *B32B 2260/046* (2013.01); *B32B 2262/101* (2013.01); *B32B 2262/106* (2013.01); *B32B 2305/10* (2013.01)

(58) Field of Classification Search
None
See application file for complete search history.

(56) References Cited

U.S. PATENT DOCUMENTS

| | | | | |
|---|---|---|---|---|
| 2002/0179271 | A1* | 12/2002 | Lindenfelser | B32B 27/12 162/281 |
| 2009/0110872 | A1* | 4/2009 | DiFonzo | B29C 70/083 428/113 |
| 2013/0108823 | A1* | 5/2013 | Beraud | B29C 70/086 428/107 |

FOREIGN PATENT DOCUMENTS

| | | |
|---|---|---|
| EP | 2 682 262 A1 | 1/2014 |
| GB | 1341438 A | 12/1973 |
| JP | 2005-336407 A | 12/2005 |

(Continued)

OTHER PUBLICATIONS

Translation of JP2005-336407, Dec. 2005.*
International Search Report for PCT/EP2014/050329 dated Sep. 19, 2014.

Primary Examiner — Erma C Cameron
(74) Attorney, Agent, or Firm — Sughrue Mion, PLLC

(57) ABSTRACT

A fiber reinforced plastic material is provided, the material including a fiber layer comprising a plurality of continuous carbon fiber reinforced thermoplastic sheets, a veil layer comprising fibers selected from at least one of glass fiber and carbon fiber, and a resin layer comprising a resin film, wherein the veil layer is impregnated by at least a portion of the resin film.

10 Claims, 3 Drawing Sheets

(56) References Cited

FOREIGN PATENT DOCUMENTS

| | | |
|---|---|---|
| JP | 2006-051813 A | 2/2006 |
| WO | 83/03795 A1 | 11/1983 |
| WO | WO-8303795 A1 * 11/1983 ............. B29C 70/08 |

* cited by examiner

REINFORCED PLASTIC MATERIAL HAVING HIGH SMOOTHNESS

FIELD OF THE DISCLOSURE

The present disclosure is related to a reinforced material and a method for making such a material. More particularly, the present disclosure is related to a carbon fiber reinforced thermoplastic material having high surface smoothness.

BACKGROUND OF THE DISCLOSURE

In many cases plastic materials can be effectively used in place of heavier and more expensive materials such as, for example, steel. However, where such materials are to be used in place of the heavier and more expensive materials, strength and finish may be of particular concern. One example of such a scenario is steel panels used in construction of, for example, automobiles where the surface may be painted and a high gloss without evident patterns is desired.

Carbon fiber reinforced plastic materials offer excellent strength to weight ratios and are well suited to replacing heavier and more expensive materials. However, such carbon fiber reinforced plastic materials have drawbacks when used in areas where an aesthetically pleasing finish is desired. For example, where exemplary steel materials may provide a roughness $R_a$ of approximately 0.15 µm, an exemplary carbon fiber reinforced plastic material may provide a roughness $R_a$ 75% higher, or up to 0.60 µm. This effect is further exacerbated when the material is subsequently finished, e.g., painted and optionally cured.

The surface quality of continuous carbon fiber reinforced plastic components is poor (e.g. high roughness) because the fiber creates some distortions in the surface smoothness. When these components are painted, the fiber patterns are clearly visible, this is known in the art as "fiber print through."

This phenomenon is caused, at least in part, by the shrinkage of the thermoplastic resin surrounding the carbon fibers and/or the carbon fiber bundles during the cooling phase of the molding process. This is known in the art as molding shrinkage.

Additionally, in the case of painted panels, during painting and curing (e.g. at around 140° C.), the thermoplastic resin expands again, and this expansion is greater than the carbon fibers. When cooling, the resin again shrinks back around the carbon fibers and carbon fiber bundles.

The difference in thermal expansion coefficients between these materials is one of the causes of surface distortion during painting. Both phenomenon mentioned above result in higher roughness and lower finish quality than the commonly used steel materials.

Carbon fiber materials forming panels currently available on the market are thermoset cured materials and they require intensive post-processing to achieve the same wave scan values as steel. Such post-processing can be expensive, time consuming, and labor intensive, and may still not reach the surface quality of steel. Therefore, it would be beneficial to improve still the finish quality while also reducing the resources required to obtain a suitable finish on these materials.

DE 10 2012007839 discloses a multilayer fiber plastic-composite component using a thermoset resin. This composite component has at least one fiber plastic layer made of a matrix resin and a fiber material embedded with carbon fibers. The visible surface is provided with a transparent glass layer, which is connected with the fiber plastic layer by the matrix resin. This material, as noted above, requires extensive post processing to render it useful in applications where an aesthetically pleasing finish is desired.

Embodiments of the present disclosure are intended to overcome the shortcomings in the current state-of-the-art.

SUMMARY OF THE INVENTION

According to embodiments of the present disclosure, a fiber reinforced plastic material is provided, including a fiber layer comprising a plurality of continuous carbon fiber reinforced thermoplastic sheets, a veil layer comprising fibers selected from at least one of glass fiber and carbon fiber, and a resin layer comprising a resin film, wherein the veil layer is impregnated by at least a portion of the resin film.

By providing such a structure, the fiber of the veil layer acts like a mesh, thereby preventing the carbon fibers of the fiber layer from moving towards the surface of the fiber reinforced plastic material. In addition, the coefficient of thermal expansion of the resin film is also reduced, which results in additional benefits (e.g., smoothing characteristics), particularly where a part is painted and cured at certain temperatures.

The fibers of the veil layer can be non-woven. "Non woven" shall be understood to include continuous non woven and/or chopped non woven.

Each of the plurality of continuous carbon fiber reinforced thermoplastic sheets can be unidirectional.

The carbon fiber is present in the continuous carbon fiber reinforced thermoplastic sheets can range between 40 to 80 percent by dry weight of the carbon fiber reinforced plastic material.

The fiber in the veil layer can present in a range of between 4 to 60 grams per square meter (g/m$^2$).

The carbon fibers of the continuous carbon fiber reinforced thermoplastic sheets can be bundled into carbon fiber bundles.

The veil layer can be impregnated by the resin film as a result of compression molding.

The fiber reinforced plastic material may include a finish layer optionally applied to the veil layer, the finish layer comprising a paint.

The resin film may include at least one of a polyamide resin and a polyphenylene sulfide resin, and the resin layer can have a thickness of between 40 µm and 250 µm.

According to some embodiments, a method of forming a fiber reinforced plastic material is provided. The method includes assembling a plurality of continuous carbon fiber reinforced thermoplastic sheets, applying a veil layer comprising fibers selected from at least one of glass fiber and carbon fiber to the plurality of continuous carbon fiber reinforced thermoplastic sheets, providing a resin film to the veil layer; and compression molding the fiber reinforced plastic material, resulting in impregnation of the veil layer with at least a portion of the resin film.

By performing these steps a fiber reinforced plastic material maybe produced where the veil layer is impregnated with resin film. In so doing, the carbon fibers are prevented from moving toward the surface and the coefficient of thermal expansion of the resin can be reduced.

The fibers of the veil layer can be non-woven and the plurality of continuous carbon fiber reinforced thermoplastic sheets can be unidirectional.

The method may further include bundling the carbon fibers of the continuous carbon fiber reinforced thermoplastic sheets prior to the assembling, and may also include applying a finish layer to the veil layer impregnated with the resin film.

The finish layer may comprise a paint, and the paint may be optionally cured following application.

The finish layer may be cured and the curing may take place between 80 and 160 degrees C., preferably 140 degrees C.

The resin film is provided so as to have a thickness of between 40 µm and 250 µm.

In some embodiments, the fiber reinforced plastic material may have a roughness value $R_a$ lower than steel.

Additional objects and advantages of the invention will be set forth in part in the description which follows, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

The accompanying drawings, which are incorporated in and constitute a part of this specification, illustrate embodiments of the invention and together with the description, serve to explain the principles of the disclosure.

DESCRIPTION OF THE EMBODIMENTS

Reference will now be made in detail to the present exemplary embodiments of the disclosure, examples of which are illustrated in the accompanying drawings. Wherever possible, the same reference numbers will be used throughout the drawings to refer to the same or like parts.

Figure 1:
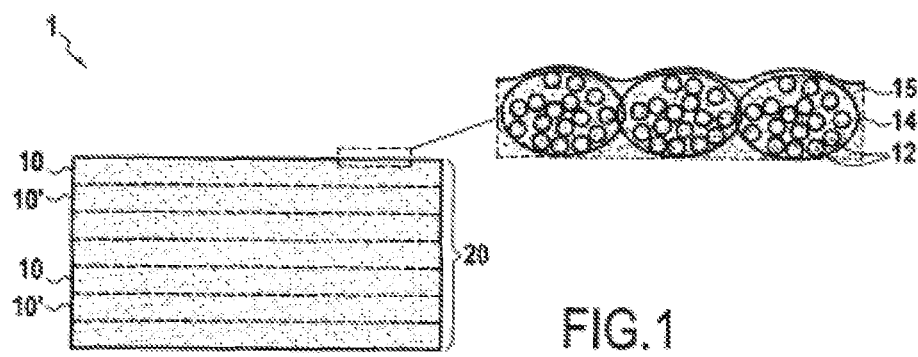
FIG. 1 is a schematic depiction of an exemplary prior art carbon fiber reinforced plastic material.

FIG. 1 is a schematic depiction of an exemplary prior art carbon fiber reinforced plastic material 1. As shown at FIG. 1, conventional materials include a fiber layer 20 comprising two or more layers 10 and 10' of unidirectional carbon fiber tape alternatingly laid at 0 degrees and 90 to one another. Any other angle can be possible Within each of the layers is a thermoplastic resin 15 that when heated, for example, during compression molding, melts and intersperses with the carbon fibers 12 and/or carbon fiber bundles 14. As the material subsequently cools, the resin 15 shrinks around the carbon fibers 12 and/or bundles of fibers 14 until hardened. This prior art process results in a level of roughness for the carbon fiber reinforced plastic material 1 that is greater than the roughness of steel.

Further, the conventional material 1 may be painted (e.g., automotive body paint) with a paint layer (not shown) and cured (e.g., at around 140 degrees C.) following the molding. This process results in expansion of the resin 15 once again, and the subsequent cooling results in shrinkage of the resin 15 and deformation of the applied paint film. These results can produce a surface with significantly higher roughness than a similarly painted steel plate.

Figure 2:
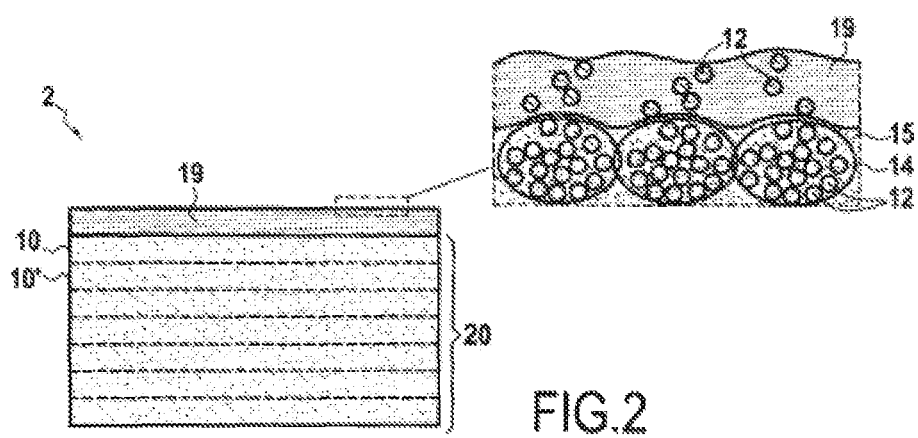
FIG. 2 is a schematic depiction of an exemplary carbon fiber reinforced plastic material according to embodiments of the present disclosure.

FIG. 2 is a schematic depiction of an exemplary carbon fiber reinforced plastic material 2 according to embodiments of the present disclosure. As shown, a fiber layer 20 comprising a plurality of continuous carbon fiber reinforced thermoplastic sheets 10 and 10' may be provided. Such fiber layers may be formed by carbon fibers 12, carbon fiber bundles 14, or any combination thereof. For example, spread tow, regular tow, or any other suitable carbon fiber tape may be used. Commercially available products include Ticona Celstran UD tape PPS-CF60.

One of skill in the art will understand that any number of layers 10 and 10' may be provided depending on factors such as, for example, desired strength and flexibility of a resulting panel. One of skill in the art understands that such design considerations may be determined for specific applications of the present disclosure.

Carbon fibers 12 may be present in such a layer 20 in a range of between 20 and 80 percent dry weight of the carbon fiber reinforced plastic material, for example at 60 percent dry weight of the layer.

In addition to the carbon fibers 12 and/or carbon fiber bundles 14, each layer 10 and 10' further comprises a resin 15, for example a thermoplastic resin such as a polyamide and/or PPS, interspersed with the carbon fibers 12 and/or carbon fiber bundles 14. Resin 15 may be present in an amount, for example, of 20-80 percent by dry weight of the layer.

On a surface of the fiber layer 20 formed as described, a resin rich layer 19 may be deposited resulting in a resin film on fiber layer 20. For example, a thermoplastic resin, e.g., polyamide or PPS, may be deposited so as to result in a resin film 19 having a thickness of between 20 and 250 µm. According to some embodiments, resin film 19 may have a thickness of 125 µm.

Figure 3:
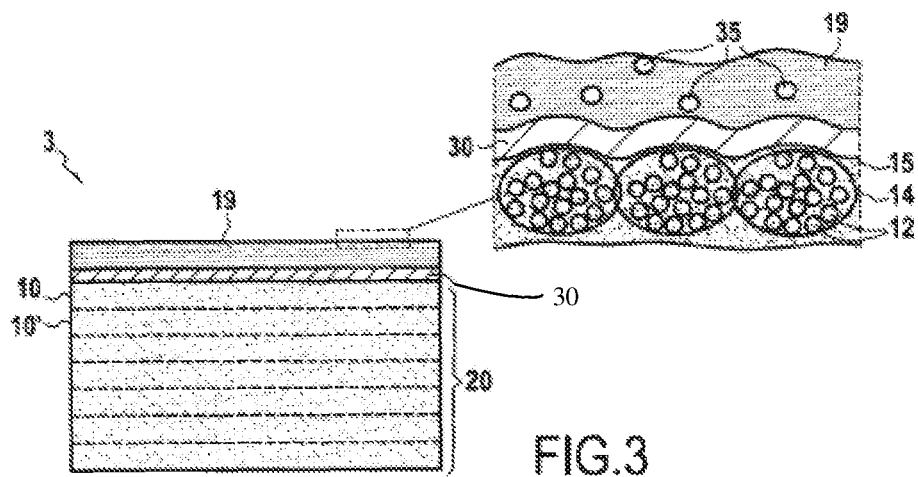
FIG. 3 is a schematic depiction of another exemplary carbon fiber reinforced plastic material according to embodiments of the present disclosure.

FIG. 3 is a schematic depiction of an improved carbon fiber reinforced plastic material 3 according to embodiments of the present disclosure. As shown, a fiber layer 20 comprising a plurality of continuous carbon fiber reinforced thermoplastic sheets 10 and 10' is provided. Such fiber layers may be formed by carbon fibers 12, carbon fiber bundles 14, or any combination thereof. For example, spread tow, regular tow, or any other suitable carbon fiber tape may be used.

Carbon fibers 12 may be present in such a layer 20 in a range of between 20 and 80 percent dry weight of the carbon fiber reinforced plastic material, for example at 60 percent dry weight.

In addition to the carbon fibers 12 and/or carbon fiber bundles 14, each layer 10 and 10' further comprises a resin 15, for example a thermoplastic resin such as a polyamide and/or PPS, interspersed with the carbon fibers 12 and/or carbon fiber bundles 14. Resin 15 may be present in an amount, for example, of 20-80 percent by dry weight of the layer.

On a surface of the fiber layer 20, a glass-fiber veil layer 30 is positioned so as to be between fiber layer 20 and resin rich layer 19.

The non woven veil may comprise, for example, non-woven glass fiber 35. Commercially available products include Owens corning M524-C33, for example.

The glass-fiber veil may be between 4 and 60 gram per square meter A resin film 19 may then be deposited so as to result in a thickness of resin between 40 and 250 μm. According to some embodiments, resin film 19 may have a thickness of 125 μm.

The above described materials may be compression molded following their assembly and then painted with a paint layer (not shown) and cured as desired.

Figure 5:
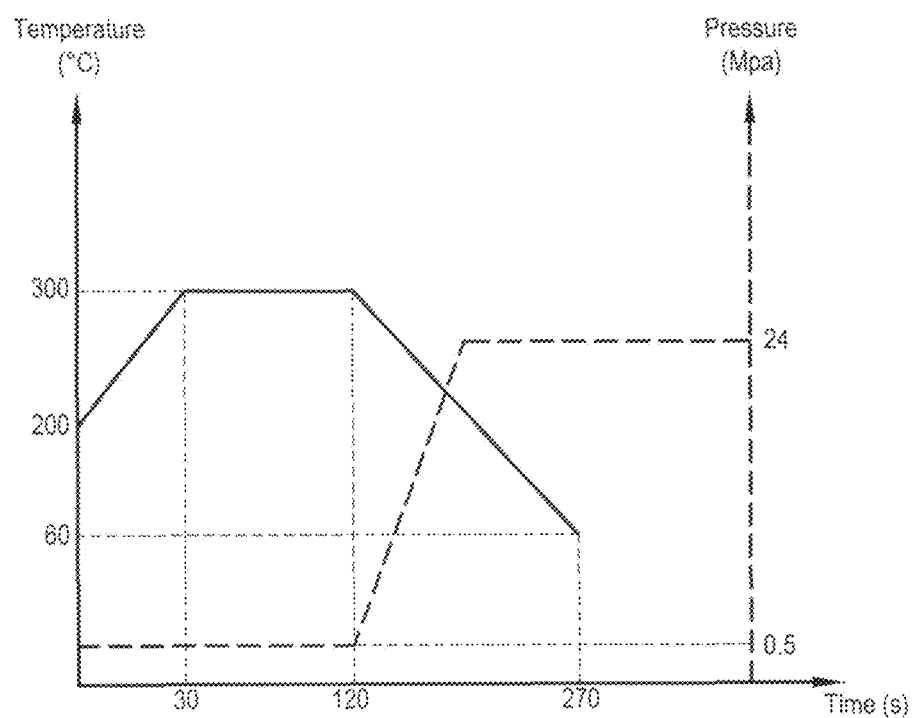
FIG. 5 is a graph highlighting exemplary conditions for compression molding in the case of a PPS resin.

FIG. 5 is a graph highlighting exemplary conditions for compression molding in the case where a PPS resin is used. One of skill in the art will understand that other conditions may be preferable where other thermoplastic resins (e.g., polyamide) are used.

Figure 6:
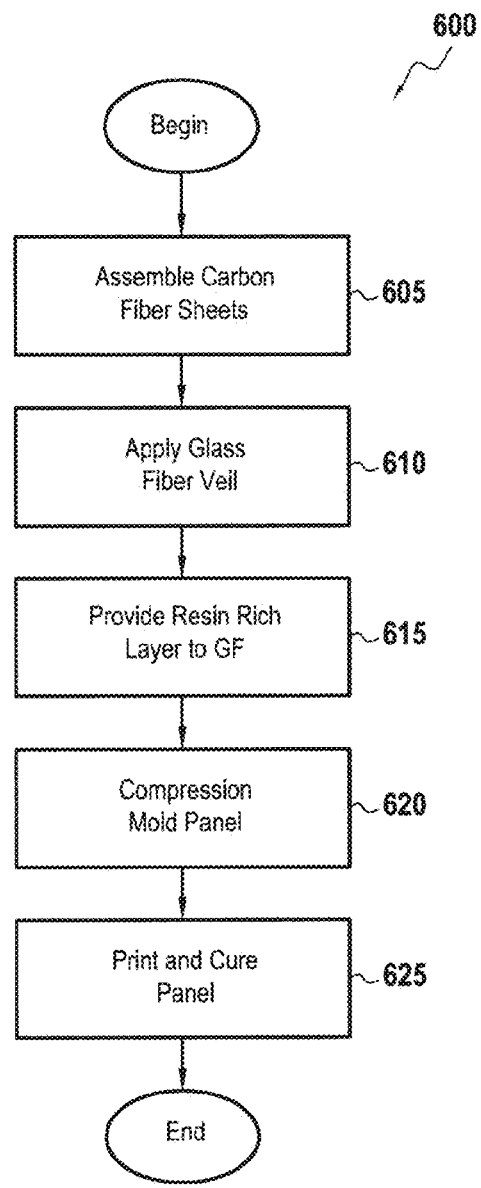
FIG. 6 is a flowchart depicting an exemplary method for manufacturing materials according to the present disclosure.

FIG. 6 is a flowchart depicting an exemplary method for manufacturing materials according to the present disclosure. A plurality of carbon fiber sheets, e.g., seven layers 10 and 10' of carbon fiber tape, may be assembled according to manufacturing specifications for a particular panel (step 605). One of skill understands that more or fewer layers 10 and 10' may be provided depending on factors such as desired strength and flexibility of a resulting panel. Such layers may be positioned alternatingly at 0 and 90 degrees to one another, or in any other suitable configuration.

Once the plurality of layers 10 and 10' have been positioned, a veil layer 30 comprising glass fibers 35 may be positioned on a surface of fiber layer 20 (step 610).

A resin rich layer (e.g., a thermoplastic resin) may then be deposited on glass fiber veil (GF) 30 at a desired thickness, e.g., 125 μm (step 615) and the panel compression molded according to desired compression molding characteristics (step 620).

Following the compression molding, the panel may be optionally painted and paint cured, as desired (step 625).

The following non-limiting examples are provided in order to aid in carrying out the presently disclosed invention.

Example 1—Comparative Example

A conventional material lay-up referred to as a panel was constructed using seven layers of UD tape including a PPS thermoplastic resin, with the layers placed at 0/90/0/90/0/90/0. Carbon fiber was present in each of the layers at a rate of 60 percent by dry weight of the carbon fiber reinforced plastic material.

The material was subsequently compression molded at a temperature of 300 degrees for 1.5 minutes, and subsequently allowed to cool.

The produced panel was then measured with a profilometer device to determine surface roughness of the top surface, and the results recorded. Cut off length is 2.5 mm and sampling length 12.5 mm.

The panel was then subjected to a painting process by applying a three-layer system. The primer was a polyester melamine cross-linked, 1 component solvent borne. The primer was sprayed to obtain a dry thickness of 30 μm to 40 μm. The primer was cured for 18 minutes at 140° C. Basecoat was a latex, melamine and urethane crosslinked, one-component conventional water-borne. The basecoat was applied to obtain a dry thickness of 10 μm to 15 μm. The basecoat was cured for 7 minutes at 140° C. The clearcoat was a two-component acrylic-urethane with a high glass transition temperature (Tg) (above 80° C.), solvent-borne. The clearcoat was applied to obtain a dry film of thickness of 30 μm to 40 μm. The clearcoat was cured for 18 minutes at 140° C.

The painted panel was then measured with the profilometer to determine surface smoothness of the top finished surface, and the results along an angle of 90° recorded. Cut off length is 2.5 mm and sampling length 12.5 mm Example 2—Panel Plus Resin Rich Layer In this example, the panel was initially prepared as was done for comparative example 1. That is, seven layers of UD tape including PPS thermoplastic resin, were laid up with the layers placed at 0/90/0/90/0/90/0. Carbon fiber was present in each of the layers at a rate of 60 percent by dry weight of the carbon fiber reinforced plastic material.

Following this preparation, a resin rich layer (e.g., PPS) having a thickness of approximately 125 μm was provided to the top layer of the material, and the material compression molded using the same compression molding technique as the comparative example. The resin film consisted of a film manufactured by extrusion and unidirectionally or birectionally stretched.

The produced panel was then measured with a profilometer device to determine surface roughness of the top surface, and the results recorded. Roughness of this material was clearly reduced over the comparative example.

The molded panel was then painted and cured using a painting process by applying a three-layer system. The primer was a polyester melamine cross-linked, one-component solvent-borne. The primer was sprayed to obtain a dry thickness of 30 μm to 40 μm. The primer was cured for 18 minutes at 140° C. Basecoat was a latex, melamine and urethane crosslinked, one-component conventional water-borne. The basecoat was applied to obtain a dry thickness of 10 μm to 15 μm. The basecoat was cured for 7 minutes at 140° C. The clearcoat was a two-component acrylic-urethane with a high Tg (above 80° C.), solvent-borne. The clearcoat was applied to obtain a dry film of thickness between 30 μm to 40 μm. The clearcoat was cured for 18 minutes at 140° C.

The painted panel was then measured with the Profilometer device at the same cut-off as the comparative example to determine surface smoothness of the top finished surface, and the results recorded.

Roughness values Ra after painting were improved over the comparative example, but were not better than steel following the painting and curing.

Example 3—Panel Plus Glass Fiber Plus Resin Rich Layer

In this example, the panel was again initially prepared as was done for comparative example 1. Carbon fiber was present in each of the layers at a rate of 60 percent by dry weight of the carbon fiber reinforced plastic material.

Following this preparation, a non-woven, glass-fiber veil was positioned between the main layup and a resin rich layer. The non-woven, glass-fiber veil had a surface weight of between 4 and 60 g/m². A resin rich layer, prepared as described above was again provided at a thickness of 125 μm on top of the glass fiber veil, and the material compression molded using the same compression molding technique as the comparative example. As a result the glass fiber veil was impregnated with a portion of the resin rich layer.

The produced panel was then measured with a profilometer device to determine surface roughness of the top surface, and the results recorded. Roughness of this material was clearly reduced over the comparative example and was surprisingly lower than steel.

The molded panel was then painted and cured using a painting process by applying a three-layer system. The primer was a polyester melamine cross-linked, one-component, solvent-borne. The primer was sprayed to obtain a dry thickness of 30 μm to 40 μm. The primer was cured for 18 minutes at 140° C. Basecoat was a latex, melamine and urethane crosslinked, one-component conventional water-borne. The basecoat was applied to obtain a dry thickness of 10 μm to 15 μm. The basecoat was cured for 7 minutes at 140° C. The clearcoat was a two-component acrylic-urethane with a high Tg (above 80° C.), solvent-borne. The clearcoat was applied to obtain a dry film of thickness between 30 μm to 40 μm. The clearcoat was cured for 18 minutes at 140° C.

The painted panel was then measured with the profilometer device at the same cut-off as the previous examples and the steel panel to determine surface smoothness of the top finished surface, and the results recorded.

Roughness values after painting were improved over example 2, and were lower than steel.

Example 4—Carbon Fiber Veil

In this example, the panel was again initially prepared as was done for comparative example 1. Carbon fiber was present in each of the layers at a rate of 60 percent by dry weight of the carbon fiber reinforced plastic material.

Following this preparation, a non-woven, carbon-fiber veil was positioned between the main layup and a resin rich layer. The non-woven, carbon-fiber veil had a surface weight of between 4 and 60 g/m². A resin rich layer, prepared as described above was again provided at a thickness of 125 μm on top of the glass fiber veil, and the material compression molded using the same compression molding technique as the comparative example. As a result the glass fiber veil was impregnated with a portion of the resin rich layer.

The produced panel was then measured with a profilometer device to determine surface roughness of the top surface, and the results recorded. Roughness of this material was clearly reduced over the comparative example and was surprisingly lower than steel.

The molded panel was then painted and cured using a painting process by applying a three-layer system. The primer was a polyester melamine cross-linked, one-component, solvent-borne. The primer was sprayed to obtain a dry thickness of 30 μm to 40 μm. The primer was cured for 18 minutes at 140° C. Basecoat was a latex, melamine and urethane crosslinked, one-component conventional water-borne. The basecoat was applied to obtain a dry thickness of 10 μm to 15 μm. The basecoat was cured for 7 minutes at 140° C. The clearcoat was a two-component acrylic-urethane with a high Tg (above 80° C.), solvent-borne. The clearcoat was applied to obtain a dry film of thickness between 30 μm to 40 μm. The clearcoat was cured for 18 minutes at 140° C.

The painted panel was then measured with the profilometer device at the same cut-off as the previous examples and the steel panel to determine surface smoothness of the top finished surface, and the results recorded.

Roughness values after painting were improved over example 2, and were lower than steel.

Table 1 shows the results of the four examples as well as results for a steel panel.

TABLE 1

| | Steel | Example 1 (Comparative) | Example 2 | Example 3 | Example 4 |
|---|---|---|---|---|---|
| Roughness at 90° before paiting (μm) | 0.176 | 0.654 | 0.262 | 0.121 | 0.115 |
| Roughness at 90° after paiting (μm) | 0.061 | 0.159 | 0.152 | 0.048 | 0.052 |

Figure 4:
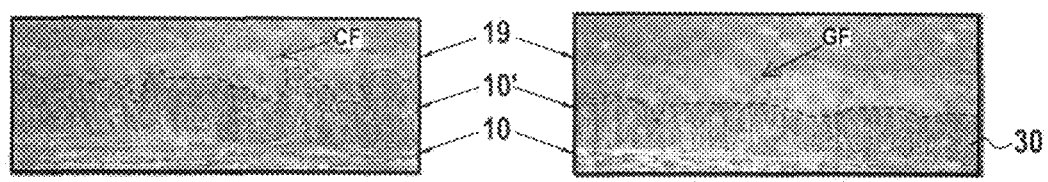
FIG. 4 is an exemplary microscopic comparison materials according to two embodiments of the present disclosure.

FIG. 4 is an exemplary microscopic comparison materials according to Examples 2 and 3 described above.

It was determined that the glass fiber veil in combination with the compression molding with a resin rich layer prevented the movement of the carbon fibers toward the finished surface. By preventing the carbon fibers from moving toward the surface, greater smoothness was obtained, indeed improved over steel in some tests.

Although the present disclosure herein has been described with reference to particular embodiments and examples, it is to be understood that these embodiments and examples are merely illustrative of the principles and applications of the present disclosure.

Throughout the description, including the claims, the term "comprising a" should be understood as being synonymous with "comprising at least one" unless otherwise stated. In addition, any range set forth in the description, including the claims should be understood as including its end value(s) unless otherwise stated. Specific values for described elements should be understood to be within accepted manufacturing or industry tolerances known to one of skill in the art, and any use of the terms "substantially" and/or "approximately" and/or "generally" should be understood to mean falling within such accepted tolerances.

Where any standards of national, international, or other standards body are referenced (e.g., ISO, etc.), such references are intended to refer to the standard as defined by the national or international standards body as of the priority date of the present specification. Any subsequent substantive changes to such standards are not intended to modify the scope and/or definitions of the present disclosure and/or claims.

It is intended that the specification and examples be considered as exemplary only, with a true scope of the disclosure being indicated by the following claims.

The invention claimed is:

1. A method of forming a fiber reinforced plastic material, the method comprising:
   assembling a fiber layer formed of a plurality of continuous carbon fiber reinforced thermoplastic sheets;
   applying a veil layer comprising glass fibers to a surface of the fiber layer, so that a first surface of the veil layer contacts the surface of the fiber layer;
   providing a resin film to a second surface of the veil layer that is opposite to the first surface of the veil layer and not in contact with the surface of the fiber layer, thereby forming an assembly in which the veil layer is disposed between the fiber layer and the resin film; and
   after applying the resin film to the second surface of the veil layer, performing compression molding of the assembly, resulting in impregnation of the veil layer with at least a portion of the resin film.

2. The method according to claim 1, wherein each of the plurality of continuous carbon fiber reinforced thermoplastic sheets is unidirectional.

3. The method according to claim 1, further comprising bundling the carbon fibers of the continuous carbon fiber reinforced thermoplastic sheets prior to the assembling of the fiber layer.

4. The method according to claim 1, further comprising, after the compression molding, applying a finish layer to the veil layer impregnated with the resin film.

5. The method according to claim 4, wherein the finish layer comprises a paint.

6. The method according to claim 5, further comprising curing the paint.

7. The method according to claim 4, further comprising curing the finish layer.

8. The method according to claim 6, wherein the curing takes place between 80 and 160 degrees C.

9. The method according to claim 1, wherein the resin film is provided so as to have a thickness of between 40 μm and 250 μm.

10. The method according to claim 1, wherein the fiber reinforced plastic material has a roughness value $R_a$ lower than a steel plate having an $R_a$ value of approximately 0.15 μm.

\* \* \* \* \*